United States Patent [19]
Di Lorenzo
[11] 3,808,072
[45] Apr. 30, 1974

[54] IN SITU ETCHING OF GALLIUM ARSENIDE DURING VAPOR PHASE GROWTH OF EPITAXIAL GALLIUM ARSENIDE

[75] Inventor: James Vincent Di Lorenzo, Piscataway, N.J.

[73] Assignee: Bell Telephone Laboratories, Incorporated, Murray Hill, Berkeley Heights, N.J.

[22] Filed: Mar. 22, 1972

[21] Appl. No.: 237,060

[52] U.S. Cl. .......................... 156/17, 117/47, 117/106
[51] Int. Cl. .......................... H01l 7/50
[58] Field of Search .............. 156/17; 148/175, 187; 117/47, 106

[56] References Cited

UNITED STATES PATENTS

| | | | |
|---|---|---|---|
| 3,522,118 | 7/1970 | Taylor et al. | 156/17 |
| 3,406,048 | 10/1968 | Immendorfer et al. | 156/17 X |
| 3,480,491 | 11/1969 | Reisman et al. | 156/17 |
| 3,592,706 | 7/1971 | Wagner | 156/17 |

*Primary Examiner*—William A. Powell
*Attorney, Agent, or Firm*—E. M. Fink

[57] ABSTRACT

A technique is described for the in situ etching of gallium arsenide substrates during vapor phase epitaxial growth. The described technique involves utilizing the arsenic trichloride-gallium-hydrogen synthesis procedure and substituting helium for hydrogen prior to growth, thereby altering the chemistry of the system and resulting in substrate etching. After attaining the desired degree of etching, hydrogen is substituted for helium and growth effected. The helium etch provides superior surfaces and greater control of etch rates.

4 Claims, 1 Drawing Figure

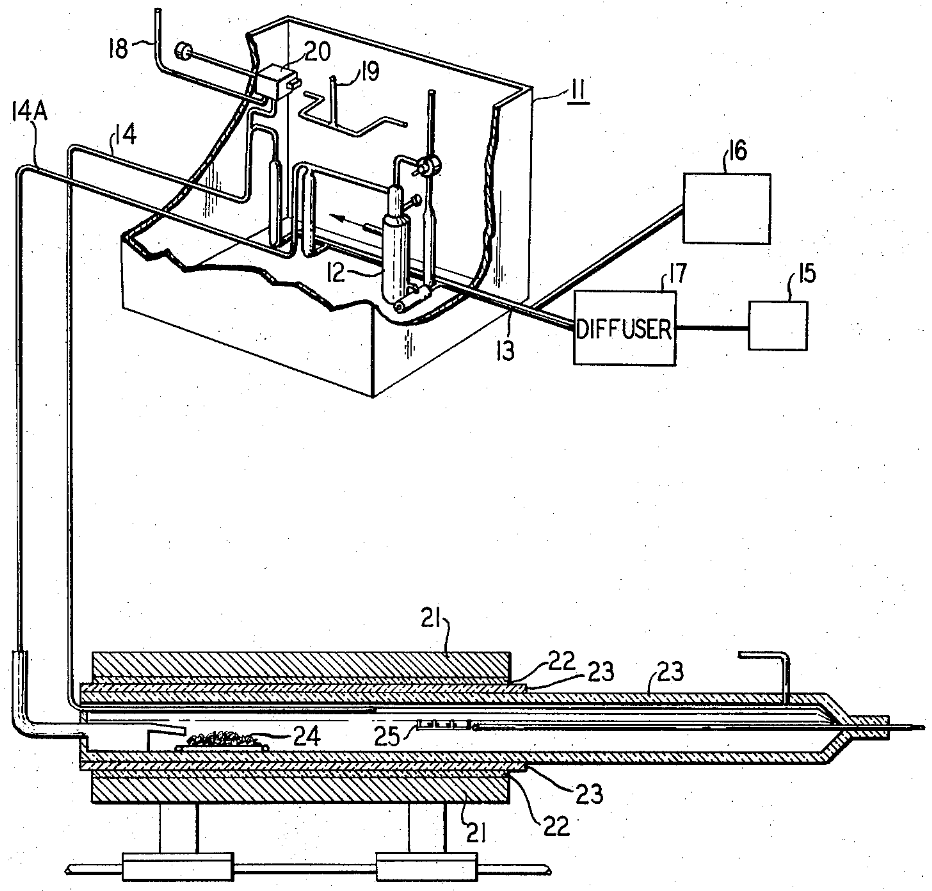
18
20
19
11
14A
14
16
12
17
15
13
DIFFUSER
21
22
23
23
24
25
23
22
21

IN SITU ETCHING OF GALLIUM ARSENIDE DURING VAPOR PHASE GROWTH OF EPITAXIAL GALLIUM ARSENIDE

This invention relates to a technique for etching gallium arsenide substrate members. More particularly, the present invention relates to a technique for in situ etching of gallium arsenide substrate members prior to epitaxial growth.

BACKGROUND OF THE INVENTION

The most widely used growth technique for epitaxial gallium arsenide involves vapor phase growth from a mixture of arsenic trichloride and gallium utilizing hydrogen as a carrier gas. In the operation of such techniques, it is conventional to etch the substrate member prior to deposition to attain satisfactory surfaces. Although efforts have been made by workers in the art to etch during the process by manipulation of the operating parameters, for example by altering the substrate temperature, their efforts have met with limited degrees of success.

SUMMARY OF THE INVENTION

In accordance with the present invention, a novel technique is described for in situ etching of gallium arsenide substrates prior to vapor phase epitaxial growth. The described technique involves utilizing the arsenic trichloride-gallium-hydrogen system and substituting helium for hydrogen prior to growth, thereby altering the chemistry of the system and effecting etching. After attaining the desired degree of etching, the helium flow is terminated and hydrogen is introduced into the system, so resulting in epitaxial growth. Studies have revealed that the helium etch provides superior surfaces and greater control of etch rate.

BRIEF DESCRIPTION OF THE DRAWING

The invention will be more readily understood by reference to the following detailed description taken in conjunction with the accompanying drawing wherein The FIGURE is a schematic representation of a system suitable for the practice of the present invention.

DETAILED DESCRIPTION

With reference now more particularly to the FIGURE, there is shown a schematic representation of an apparatus suitable for use in the practice of the present invention. Shown in the FIGURE is a bubbler system 11 including a reservoir of arsenic trichloride 12 and conduit means 13, 14, and 14A, respectively, for admitting and removing hydrogen or helium to and from the bubbler system. The system also includes a source of hydrogen 15, a source of helium 16, hydrogen purifier 17, means 18 for admitting a dopant to the system, means 19 for admitting nitrogen to the system and variable leak valve 20. The apparatus employed also includes an oven 21 having contained therein a muffle tube 22 and quartz reaction tube 23.

In the operation of the growth process, heating of the reaction chamber is initiated, hydrogen from source 15 is diffused through palladium-silver membranes in purifier 17 and flowed through control valves to liquid arsenic trichloride reservoir 12 and transports arsenic trichloride to reaction chamber 23. The hydrogen flow also serves as a dilute control for the arsenic trichloride flow and for dopant transfer. The arsenic trichloride reservoir is maintained at a temperature within the range of 15° – 25°C and the flow rate of hydrogen at about 300 cc/min.

A source of gallium 24 is then introduced into reaction chamber 23 which contains a gallium arsenide substrate 25. Heating of the reaction chamber is continued until the gallium attains a temperature of 800°C and the substrate a temperature of the order of 750°C at which point epitaxial growth occurs at a rate within the range of 0.2 – 0.3 $\mu$m/min.

In accordance with the present invention, etching of the substrate surface may be effected prior to growth by substituting pure grade helium (99.9999 percent purity) for the hydrogen and maintaining a flow rate within the range of 350 to 450 cc/min., thereby resulting in etching at a rate within the range of 0.2 to 1 $\mu$m/min. Etching is continued until the desired degree of material removal is attained at which point helium flow is terminated and hydrogen flow initiated. The rate of ething may be conveniently controlled within the range of 0.2 to 0.5 $\mu$m/min. by adding from 50 to 20 cc/min. of hydrogen to the helium. Growth proceeds immediately after etching without altering any of the system parameters such as arsenic trichloride temperature or the temperature of source gallium or the gallium arsenide substrates. Studies of etched substrates have revealed that the surfaces so obtained are superior to those obtained by prior art techniques, so resulting in characteristics uniquely suited for various device applications.

What is claimed is:

1. Technique for the vapor phase epitaxial growth of gallium arsenide which comprises the steps of transporting arsenic trichloride with a hydrogen carrier gas to a reaction chamber containing a gallium arsenide substrate and a source of gallium and heating the substrate to a temperature of approximately 750°C and the gallium to approximately 800°C, thereby resulting in the epitaxial growth of gallium arsenide, characterized in that prior to growth etching of the substrate is effected by transporting arsenic trichloride to said reaction chamber in a helium carrier gas.

2. Technique in accordance with claim 1 wherein the helium flow rate is within the range of 350 to 450 cc/min.

3. Technique in accordance with claim 1 wherein the etch rate of gallium arsenide is within the range of 0.2 to 1 $\mu$m/min.

4. Technique in accordance with claim 3 wherein hydrogen in an amount ranging from 50 to 20 cc/min. is added to the helium.

* * * * *